(12) United States Patent
Nance et al.

(10) Patent No.: US 7,613,932 B2
(45) Date of Patent: Nov. 3, 2009

(54) METHOD AND SYSTEM FOR CONTROLLING ACCESS TO SOFTWARE FEATURES IN AN ELECTRONIC DEVICE

(75) Inventors: Kara L. Nance, Fairbanks, AK (US); J. Douglas Henley, Mead, CO (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 10/422,709

(22) Filed: Apr. 24, 2003

(65) Prior Publication Data

US 2004/0215969 A1    Oct. 28, 2004

(51) Int. Cl.
*G06F 7/04* (2006.01)
*G08B 23/00* (2006.01)
*H03M 1/68* (2006.01)
*H04K 1/00* (2006.01)

(52) U.S. Cl. .............. 713/191; 726/2; 726/22; 726/26; 380/255

(58) Field of Classification Search .......... 726/2–21, 726/34–36, 26; 380/255
See application file for complete search history.

(56) References Cited

U.S. PATENT DOCUMENTS

| | | | |
|---|---|---|---|
| 4,864,618 A | 9/1989 | Wright et al. | |
| 5,402,528 A | 3/1995 | Christopher et al. | |
| 5,500,715 A * | 3/1996 | Ta et al. ................. | 399/1 |
| 5,606,609 A | 2/1997 | Houser et al. | |
| 5,633,932 A | 5/1997 | Davis et al. | |
| 6,245,778 B1 | 6/2001 | Hadley et al. | |
| 6,246,326 B1 | 6/2001 | Wiklof et al. | |
| 6,246,778 B1 | 6/2001 | Moore | |
| 6,490,684 B1 * | 12/2002 | Fenstemaker et al. ....... | 713/182 |
| 7,062,189 B2 * | 6/2006 | Hirano ......................... | 399/80 |
| 7,082,200 B2 * | 7/2006 | Aboba et al. ................ | 380/273 |
| 2001/0037462 A1 | 11/2001 | Bengtson | |
| 2002/0002706 A1 * | 1/2002 | Sprunk ......................... | 725/29 |
| 2003/0053815 A1 * | 3/2003 | Testardi et al. .............. | 399/79 |
| 2004/0005919 A1 * | 1/2004 | Walker et al. ................ | 463/23 |
| 2004/0190057 A1 * | 9/2004 | Takahashi et al. ........... | 358/1.15 |
| 2006/0137003 A1 * | 6/2006 | Glania ......................... | 726/11 |
| 2006/0200527 A1 * | 9/2006 | Woods ........................ | 709/206 |

FOREIGN PATENT DOCUMENTS

EP    1035468    9/2000

\* cited by examiner

*Primary Examiner*—Nasser G Moazzami
*Assistant Examiner*—Chinwendu C Okoronkwo
(74) *Attorney, Agent, or Firm*—David W. Victor; Konrad Raynes & Victor LLP

(57) ABSTRACT

A method and system for controlling access to features on an electronic device, such as a printer, is disclosed. The electronic device is shipped with multiple software features, but one or more of the features may be disabled. According to aspects of the present invention, when a customer subsequently licenses or purchases one of the disabled features, the feature is enabled as follows. A key corresponding to the disabled feature is stored on a portable storage device. When the portable storage device is inserted into the electronic device, the key is customized based on device-specific information of the electronic device, thereby reducing a possibility that the key can be copied and used for enabling the feature on more than one device. The customized key is then used to enable the feature in the electronic device.

33 Claims, 4 Drawing Sheets

METHOD AND SYSTEM FOR CONTROLLING ACCESS TO SOFTWARE FEATURES IN AN ELECTRONIC DEVICE

FIELD OF THE INVENTION

The present invention relates to methods for software feature licensing, and more particularly to a method and system for controlling access to software features in an electronic device.

BACKGROUND OF THE INVENTION

Advanced printers are often shipped to customers as base packages where only a small subset of built-in software features are enabled. Embedded controller software is included in the printers as a product-specific package which is standard for multiple models of printers, and controls which capabilities or features of the printer are enabled. After some time, the customer may purchase the additional features from the manufacturer or vendor, and in return, the purchased feature will be enabled. After some time, the customer may purchase the additional features from the manufacturer or vendor, and in return, the purchased feature will be enabled.

A mechanism is required to control the enabling of these features. One solution is to implement feature control through a physical device, such as a compact flash card, and ship printers with a socket for reading the compact flash card. When a customer purchases a new feature, a compact flash card with some information for enabling the feature is sent to the customer. Once the card is inserted into the printer, the feature identified on the card is enabled. The problem with this method is that there is no built-in control to prevent the user from copying the contents of the compact flash to other compact flashes and installing the cards in multiple printers, rather than purchasing the feature option for each printer. Should this type of piracy occur, the printer manufacturer or vendor can lose a great deal of licensing revenue.

One solution to prevent duplication of the compact flash is to send the compact flash to customers with contents that are unique to the customer's printer. Creating compact flash devices with contents specific to each printer, however, would face prospective time delays due to creating personalized devices, and would increase cost to the point where it would be prohibitive to implement such a feature control.

Accordingly, what is needed is a method and system for controlling software features in an electronic device, such as a printer, in a manner that maximizes licensing revenue for the manufacturer. The method should be cost effective, easy to implement, and should have the ability to enable multiple features over time. The present invention addresses such a need.

SUMMARY OF THE INVENTION

The present invention provides a method and system for controlling access to features on an electronic device, such as a printer. The electronic device is shipped with multiple software features, but one or more of the features may be disabled. According to aspects of the present invention, when a customer subsequently licenses or purchases one of the disabled features, the feature is enabled as follows. A key corresponding to the disabled feature is stored on a portable storage device. When the portable storage device is inserted into the electronic device, the key is customized based on device-specific information of the electronic device. The customized key is then used to enable the feature in the electronic device.

According to the method and system disclosed herein, by customizing the key for each printer, after a customer licenses a feature, the present invention reduces the possibility that the key can be copied and used to enable the feature on more than one printer.

DETAILED DESCRIPTION OF THE INVENTION

The present invention relates to a mechanism for controlling access to features on an electronic device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
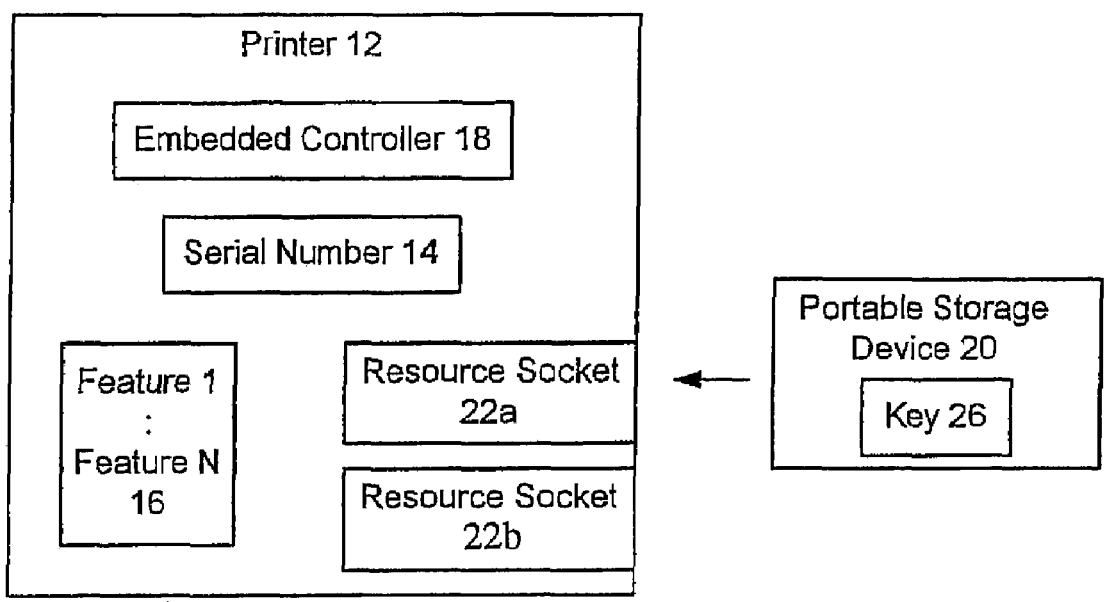
FIG. 1 is block diagram illustrating a system for controlling software features in an electronic device in accordance with the present invention.

FIG. 1 is block diagram illustrating a system 10 for controlling software features in an electronic device in accordance with the present invention. In a preferred embodiment, the electronic device comprises a printer 12, but any type of electronic device could be used with the system described herein. The printer 12 is sold or leased to a customer by a manufacturer or vendor. The printer 12 typically has a unique identifier, such as a serial number 14, to distinguish it from other printers 12 of the same model. Although the printer 12 is shipped loaded with a variety of preloaded software features 16, the printer 12 is typically sold as a base package where only a limited number of the features 16 are enabled, and the rest are disabled. An embedded controller 18 within the printer 12 controls access to these software features 16. After manufacture of printer 12, the customer may license one or more additional features 16 from the manufacturer or vendor. The present invention provides a mechanism to enable the licensed features 16 in a secure manner.

According to the present invention, a portable storage device 20, such as compact flash card, is used to control access to the selected feature 16 in a manner that enables the feature 16 on the printer 12, while preventing the customer from using the portable storage device 20 to enable the same feature 16 in other printers 12. In order to accept the portable storage device 20, the printer 12 is provided with at least one resource socket 22 capable of reading the portable storage device 20. In the preferred embodiment where the portable storage device 20 is a compact flash, the printer 12 includes two compact flash sockets 22a and 22b.

Figure 2:
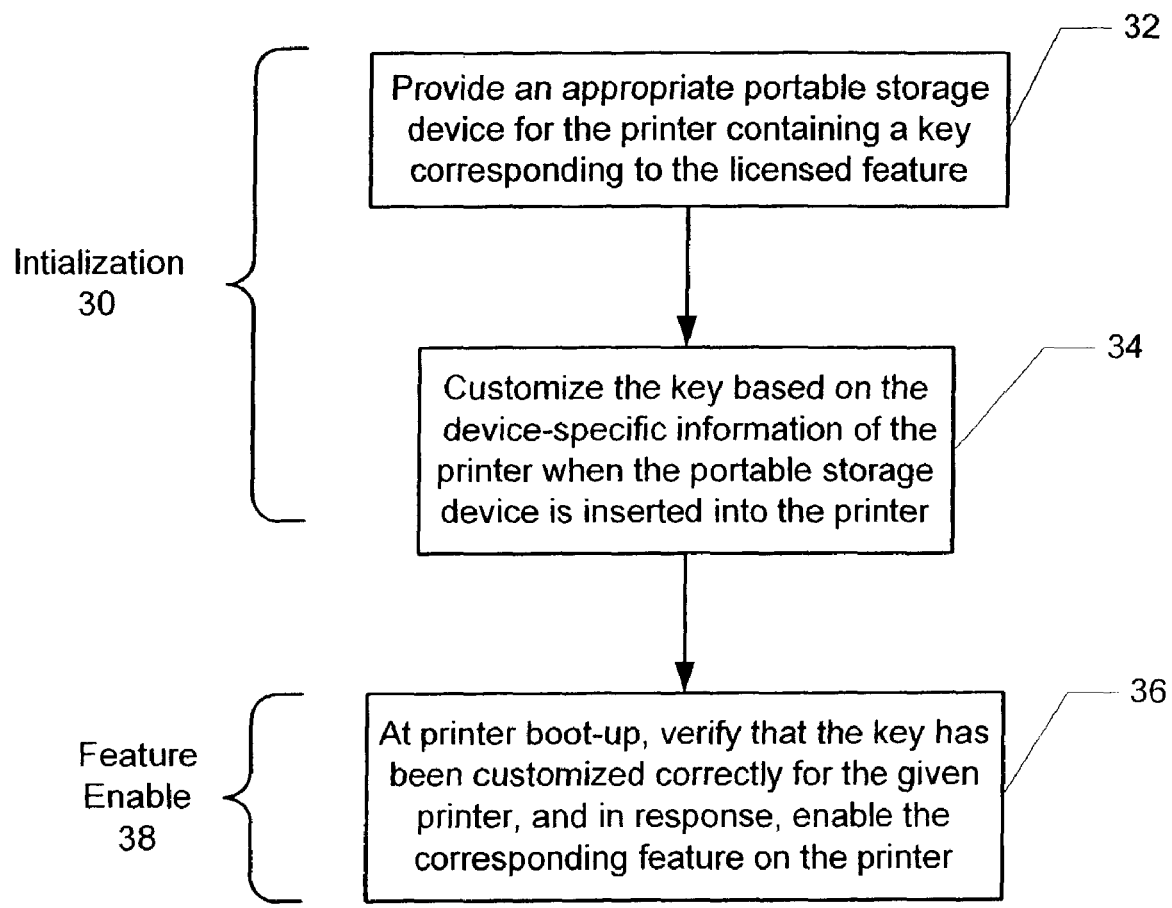
FIG. 2 illustrates a flow chart of the process for controlling access to features on an electronic device, such as a printer.

FIG. 2 illustrates a flow diagram of the process for controlling access to features 16 (see FIG. 1) on an electronic device, such as a printer 12 (see FIG. 1) in accordance with a preferred embodiment of the present invention. The present invention operates in two stages; an initialization stage 30 and a feature enable stage 38. Referring to both FIGS. 1 and 2, once a printer 12 customer has selected a feature 16 to license or purchase for a particular model printer 12, the initialization stage begins in step 32, where an appropriate portable storage device 20 for the printer 12 is provided that contains a key 26 corresponding to the licensed feature 16. In step 34, the portable storage device 20 with the corresponding key 26 is inserted into the resource socket 22a, and the embedded controller 18 customizes the key 26 based on the device-specific information of the printer 12. In a preferred embodiment, the embedded controller 18 hashes the key 26 with the serial number 14 of the printer 12 and overwrites the original key 26 with hashed key 26 on the compact flash.

After the initialization stage 30, the feature enable stage 36 uses the portable storage device 20 to activate the licensed feature 16. During printer 12 boot-up in step 36, the embedded controller 18 verifies that the key 26 on the portable storage device 20 has been customized correctly for the given printer 12, and enables the corresponding feature 16 on the printer 12 in response.

In a further aspect of the present invention, the initialization stage 30, in which the key 26 is customized to work with a specific printer 12, is performed by service personnel authorized by the printer 12 manufacturer or vendor. Performing the initialization of the key 26 by authorized personnel, rather than the customer, greatly reduces the possibility that the key 26 can be copied prior to customization and used in other printers 12.

Figure 3:
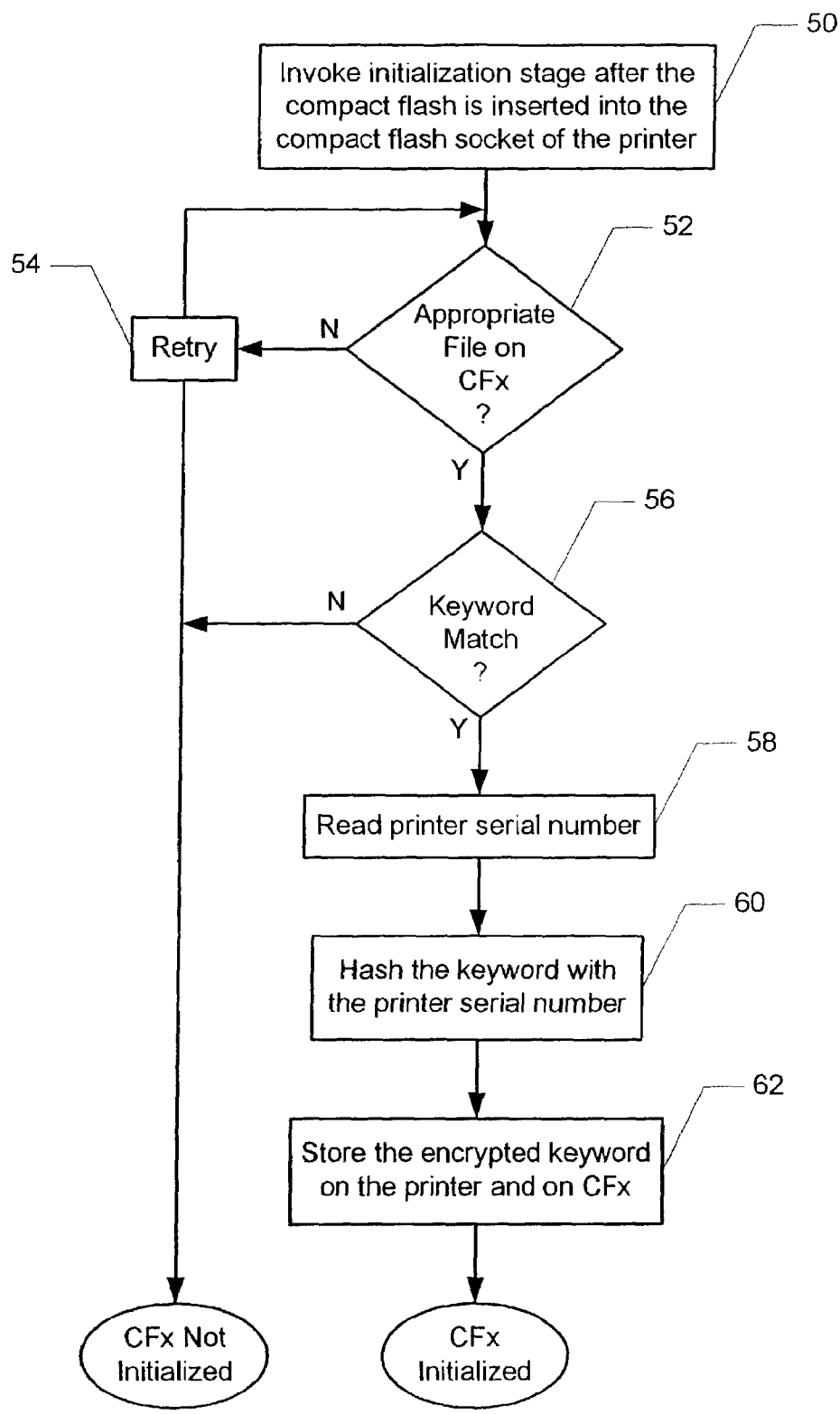
FIG. 3 illustrates a flow chart illustrating further details of a initialization stage in a preferred embodiment of the present invention.

FIG. 3 illustrates a flow chart illustrating the initialization stage 30 (see FIG. 3) in further detail according to a preferred embodiment of the present invention. The flow chart of FIG. 3 will be discussed in reference to the system illustrated in FIG. 1. The embedded controller 18 invokes the initialization stage in step 50 after the compact flash is inserted into the compact flash socket 22 of the printer 12. In a preferred embodiment, the key 26 is implemented as a keyword contained in a file on the compact flash, where the file name identifies the model of the printer 12. An example of the contents of the compact flash for enabling the feature 16 PCL/PS in a model Infoprint 85 printer 12 is as follows:

File name: PCLPS85.ff

Contents: Initial keyword 1

The embedded controller 18 first determines that the compact flash contains the appropriate type of file in step 52. If not, the read attempt is retried some number of times in step 54 before the process terminates. If the compact flash does contain the appropriate type of file, then in step 56 the embedded controller 18 determines whether the keyword in the file matches any of the keywords for the features 16 stored in the printer 12.

If the keywords match, then in step 58 the embedded controller 18 reads the printer 12 serial number 14 and hashes the keyword with the printer 12 serial number 14 in step 60, creating an encrypted keyword. In step 62, the embedded controller 18 stores the encrypted keyword on the printer hard drive and on the compact flash, overwriting the original keyword. In a preferred embodiment, the original keyword is overwritten by replacing the original file with a new file that has a different extension and that contains the encrypted keyword. At the end of the process, the compact flash is initialized to enable on the printer 12. However, if the keywords do not match in step 56, or the number of retries is exceeded in step 54, then the process ends and the initialization stage fails. An example of the contents of a successfully initialized compact flash for enabling DBCS fonts in a model Infoprint 85 printer 12 is as follows:

File name: PCLPS85.ef

Contents: Encrypted value for a combination of keyword 1 and the Infoprint 85 printer's serial number Randomly generated noise After configuration by the service personnel, the customer retains possession of the configured compact flash. The compact flash is kept in the compact flash socket 22 and used during the feature enable stage 36 to enable the feature 16 when the printer 12 is powered on.

Figure 4:
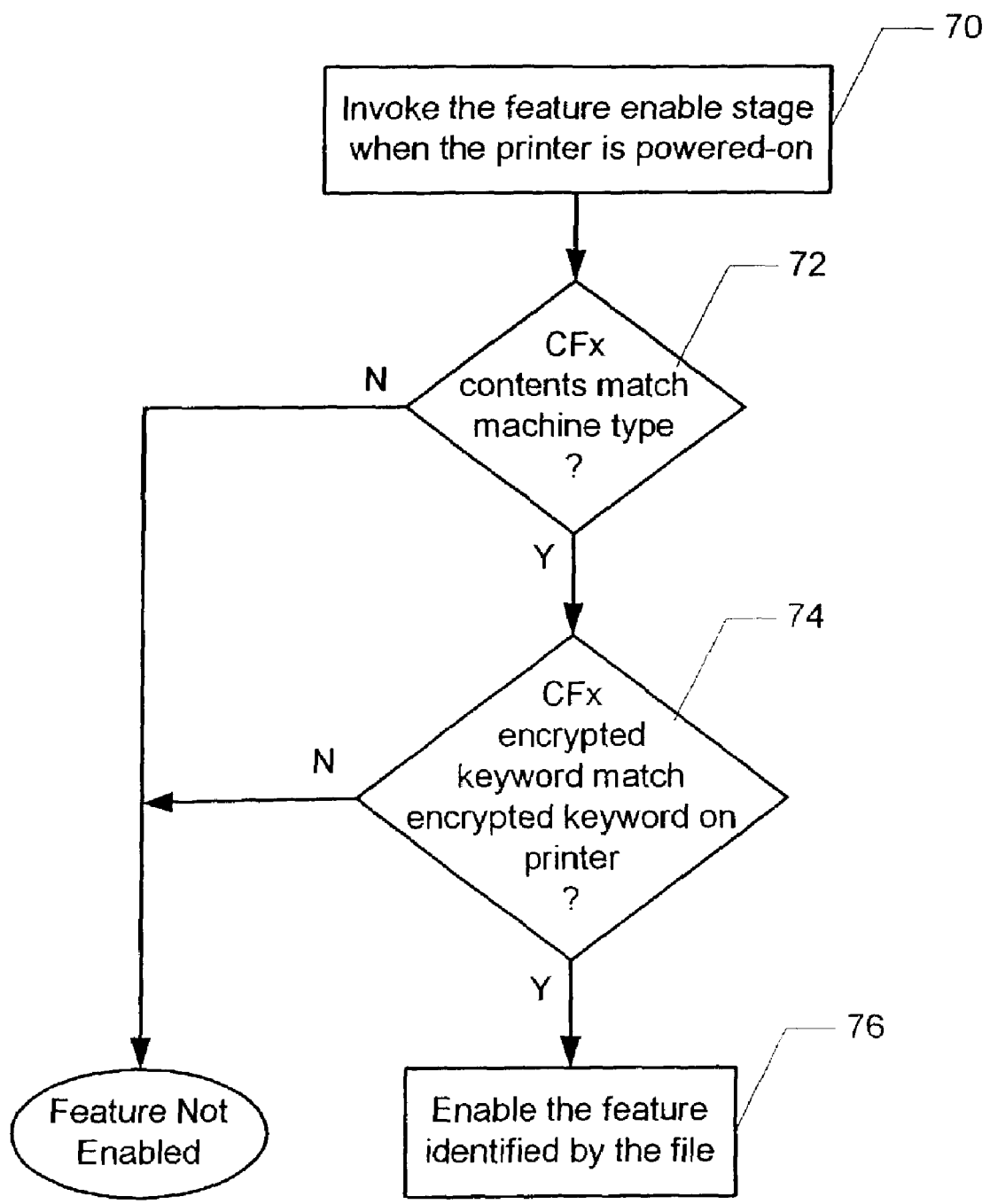
FIG. 4 illustrates a flow chart illustrating further details of a feature enable stage in a preferred embodiment of the present invention.

FIG. 4 illustrates a flow chart illustrating further details of the feature enable stage 36 (see FIG. 3) in a preferred embodiment of the present invention. The flow chart of FIG. 4 will be discussed in reference to the system illustrated in FIG. 1. The embedded controller 18 invokes the feature enable stage 36 in step 70 when the printer 12 is powered-on. In step 72, the embedded controller 18 verifies that the contents of the compact flash matches the machine type of the printer. In a preferred embodiment, this is determined from the file name and extension of compact flash. In the example above, assuming that the configured compact flash was inserted into a model infoprint 85 printer, then the embedded controller 18 would read the filename "PCLPS85.ef" and determine that the contents of the compact flash match the machine type, model 85.

If the contents of the compact flash match the machine type and contains an initialized file, then in step 74, the embedded controller 18 verifies that the encrypted keyword on the compact flash matches the encrypted keyword stored on the printer's 12 hard drive. If so, then in step 76, the embedded controller 18 enables the feature 16 identified by the file, in this example "PCLPS." If the machine type does not match in step 72 or the encrypted values do not match in step 74, then no features 16 are enabled and the process ends.

A further aspect of the present invention is the ability to enable more than one feature 16 on the printer 12. Referring again to FIG. 1, to enable an additional feature 16 on the printer 12, another compact flash is installed in the second flash socket 22b of the printer 12. For example, assume that the customer has licensed a second feature 16 for enabling DBCS fonts, which are common to all printer models. An example of the contents of the second compact flash for enabling the DBCS fonts is as follows:

File name: DBCSFONT.ff

Contents: Initial keyword 2

The configuration procedure is run with both compact flashes installed in the printer 12. The configuration process is the same as described above. However, the keyword from the second compact flash is copied to the first compact flash, and the initialization stage 30 (see FIG. 3) is performed as described. This results in the compact flash containing multiple files corresponding to different features 16, each with customized keywords that have been encrypted for that particular printer 12. After the second initialization, the first compact flash would contain the following files:

File name: PCLPS85.ef

Contents: Encrypted value for a combination of keyword 1 and the printer's serial number Randomly generated noise File name: DBCSFONT.ef Contents: Encrypted value for a combination of keyword 2 and the printer's serial number Randomly generated noise After configuration, the second compact flash can be removed from the second resource socket 22 and discarded if desired, unless additional information required to run the feature 16 is resident on the compact flash. During the feature enable stage 36 (see FIG. 3) when the printer 12 is powered on, the embedded controller 18 verifies that the encrypted values on the compact flash match the encrypted values stored in the printer 12, and enables the features 16 listed on the compact flash accordingly.

According to the present invention, the methodology for printer feature licensing disclosed herein provides the following advantages:

- A single part (storage device) is associated with each feature 16 shipped in the printer 12, which minimizes manufacturing logistics and provides effective means of control for licensing and royalties.
- Customers cannot reuse the compact flash in another printer 12 once the compact flash has been configured.
- Multiple features 16 can be installed on a single printer 12 over a period of time.
- The features 16 installed in a manufactured printer 12 are the same regardless of which features 16 are purchased by the customer.
- The compact flash has the same format regardless of the features 16 purchased.
- The present invention makes it more difficult for customers to enable features 16 for which they should not have access.
- The integrity of distributing manufacturer or vendor software is improved.
- Allows the addition of feature 16 and control within the same framework without changes to the printer 12.
- The methodology is scalable to all printers 12 with compact flash capabilities, and more particularly, the methodology is scalable to all devices with embedded controllers 18 and external resource capabilities.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for controlling access to features on an electronic device, wherein at least one of the features is disabled, the method comprising:
   storing a key on a portable storage device corresponding to the at least one of the features disabled on the electronic device;
   determining, by the electronic device, whether the key on the portable storage device matches a stored key in the electronic device;
   in response to determining that the key on the portable storage device matches the stored key on the electronic device, performing:
      customizing, by the electronic device, the stored key based on device-specific information of the electronic device when the portable storage device is coupled to the electronic device; and
      storing, by the electronic device, the customized key in the electronic device and on the portable storage device; and
   using, by the electronic device, the customized key to enable in the electronic device the at least one of the features that is disabled in response to determining that the customized key stored in the portable storage device coupled to the electronic device matches the customized key stored in the electronic device.

2. The method of claim 1, further comprising:
   performing a feature enable stage during a boot-up of the electronic device, wherein the electronic device uses the customized key to enable the at least one feature during the feature enable stage.

3. The method of claim 1, wherein customizing the key further comprises:
   hashing the key with a serial number of the electronic device, creating en encrypted key, wherein the customized key comprise the encrypted key.

4. The method of claim 1, further comprising:
   storing the key on the portable storage device as a keyword contained in a file on the portable storage device.

5. The method of claim 1, wherein the portable storage device comprises a compact flash.

6. The method of claim 1 wherein the electronic device comprises a printer.

7. The method of claim 1 wherein the at least one of the features disabled is a software feature.

8. The method of claim 2, wherein the key is customized when the portable storage device is coupled to a resource socket on the electronic device.

9. The method of claim 2, further comprising:
   using personnel authorized by a manufacturer of vendor of the electronic device to customize the key during an initialization stage.

10. The method of claim 8, wherein the resource socket comprises a first resource socket, further comprising:
    enabling a second feature in the electronic device by coupling a second portable storage device that contains a second key corresponding to the second feature to a second resource socket on the electronic device.

11. The method of claim 10, further comprising:
    copying the key from the second portable storage device to the first portable storage device; and
    encrypting the second key.

12. A computer-readable medium containing program instructions executed in an electronic device for controlling access to features in the electronic device, wherein the electronic device is configured to couple to a portable storage device, wherein the program instructions are executed to perform operations, the operations comprising:
    determining whether a key on the portable storage device corresponding to at least one of the features disabled on the electronic device matches a stored key in the electronic device;
    in response to determining that the key on the portable storage device matches the stored key on the electronic device, performing:
       customizing the stored key based on device-specific information of the electronic device when the portable storage device is coupled to the electronic device; and
       storing the customized key in the electronic device and on the portable storage device; and
    using the customized key to enable in the electronic device the at least one of the features that is disabled in response to determining that the customized key stored in the portable storage device coupled to the electronic device matches the customized key stored in the electronic device.

13. The computer-readable medium of claim 12, wherein the operations further comprise:
    performing a feature enable stage during a boot-up of the electronic device, wherein the electronic device uses the customized key to enable the at least one feature during the feature enable stage.

14. The computer-readable medium of claim 13, wherein the key is customized when the portable storage device is coupled to a resource socket on the electronic device.

15. The computer-readable medium of claim 13, wherein the operations further comprise:

using personnel authorized by a manufacturer or vendor of the electronic device to customize the key during an initialization stage.

16. The computer-readable medium of claim 12, wherein customizing the key further comprises:
hashing the key with a serial number of the electronic device, creating an encrypted key, wherein the customized key comprises the encrypted key.

17. The computer-readable medium of claim 14, wherein the resource socket comprises a first resource socket, wherein the operations further comprise:
enabling a second feature in the electronic device by coupling a second portable storage device that contains a second key corresponding to the second feature to a second resource socket on the electronic device.

18. The computer-readable medium of claim 17, wherein the operations further comprise:
copying the key from the second portable storage device to the first portable storage device; and
encrypting the second key.

19. The computer-readable medium of claim 12, wherein the operations further comprise:
storing the key on the portable storage device as a keyword contained in a file on the portable storage device.

20. The computer-readable medium of claim 12, wherein the portable storage device comprises a compact flash.

21. The computer-readable medium of claim 12 wherein the electronic device comprises a printer.

22. The computer-readable medium of claim 12 wherein the at least one of the features disabled is a software feature.

23. A system for controlling access to features and coupling to a portable storage device, the system comprising:
an electronic device comprising,
multiple preloaded software features;
a resource socket to couple to the portable storage device; and
an embedded controller for controlling access to the software features, wherein at least one of the features is disabled, and wherein the embedded control performs operations, the operations comprising:
determining whether a key, corresponding to the at least one of the features disabled on the electronic device, on the portable storage device coupled to the resource socket matches a stored key in the electronic device;
in response to determining that the key on the portable storage device matches the stored key on the electronic device, performing:
customizing the stored key based on device-specific information of the electronic device when the portable storage device is coupled to the electronic device; and
storing the customized key in the electronic device and on the portable storage device; and
using the customized key to enable in the electronic device the at least one of the features that is disabled in response to determining that the customized key stored in the portable storage device coupled to the electronic device matches the customized key stored in the electronic device.

24. The system of claim 23, wherein the operations further comprise:
performing a feature enable stage during a boot-up of the electronic device, wherein the electronic device uses the customized key to enable the at least one feature during the feature enable stage.

25. The system of claim 24, wherein the key is customized when the portable storage device is coupled to a resource socket on the electronic device.

26. The system of claim 24, wherein the operations further comprise:
using personnel authorized by a manufacturer or vendor of the electronic device to customize the key during an initialization stage.

27. The system of claim 23, wherein customizing the key further comprises:
hashing the key with a serial number of the electronic device, creating an encrypted key, wherein the customized key comprises the encrypted key.

28. The system of claim 25, wherein the resource socket comprises a first resource socket, wherein the operations further comprise:
enabling a second feature in the electronic device by coupling a second portable storage device that contains a second key corresponding to the second feature to a second resource socket on the electronic device.

29. The system of claim 28, wherein the operations further comprise:
copying the key from the second portable storage device to the first portable storage device; and
encrypting the second key.

30. The system of claim 23, wherein the operations further comprise:
storing the key on the portable storage device as a keyword contained in a file on the portable storage device.

31. The system of claim 23, wherein the portable storage device comprises a compact flash.

32. The system of claim 23 wherein the electronic device comprises a printer.

33. The system of claim 23 wherein the at least one of the features disabled is a software feature.

* * * * *

UNITED STATES PATENT AND TRADEMARK OFFICE
CERTIFICATE OF CORRECTION

PATENT NO.        : 7,613,932 B2
APPLICATION NO.   : 10/422709
DATED             : November 3, 2009
INVENTOR(S)       : Nance et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Fourteenth Day of December, 2010

David J. Kappos
*Director of the United States Patent and Trademark Office*